June 25, 1946.   W. J. MILLER   2,402,655
POTTERY SLIP-CASTING APPARATUS
Filed Sept. 22, 1943   5 Sheets-Sheet 1
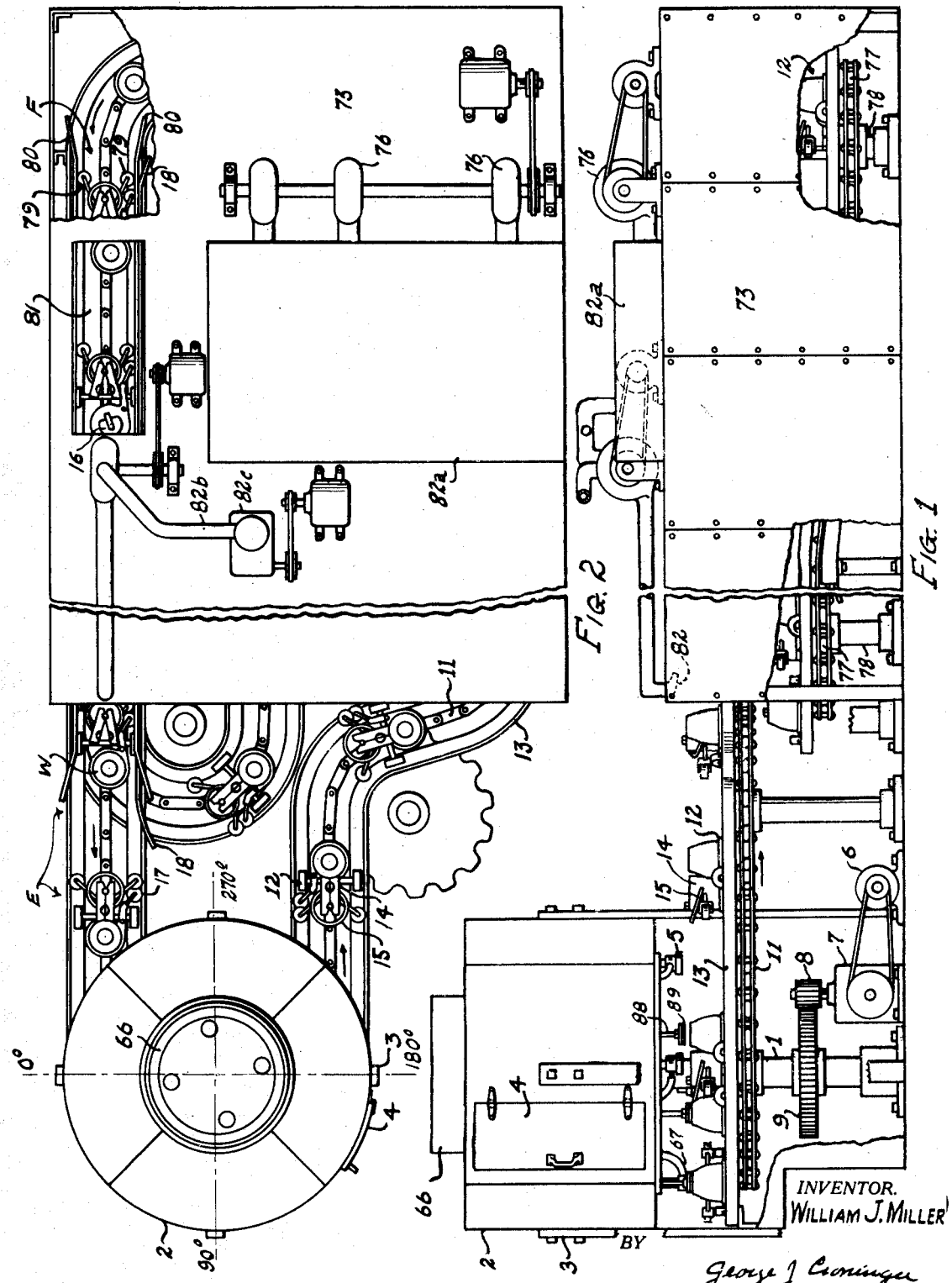
INVENTOR.
WILLIAM J. MILLER
BY
George J. Croninger
ATTORNEY.

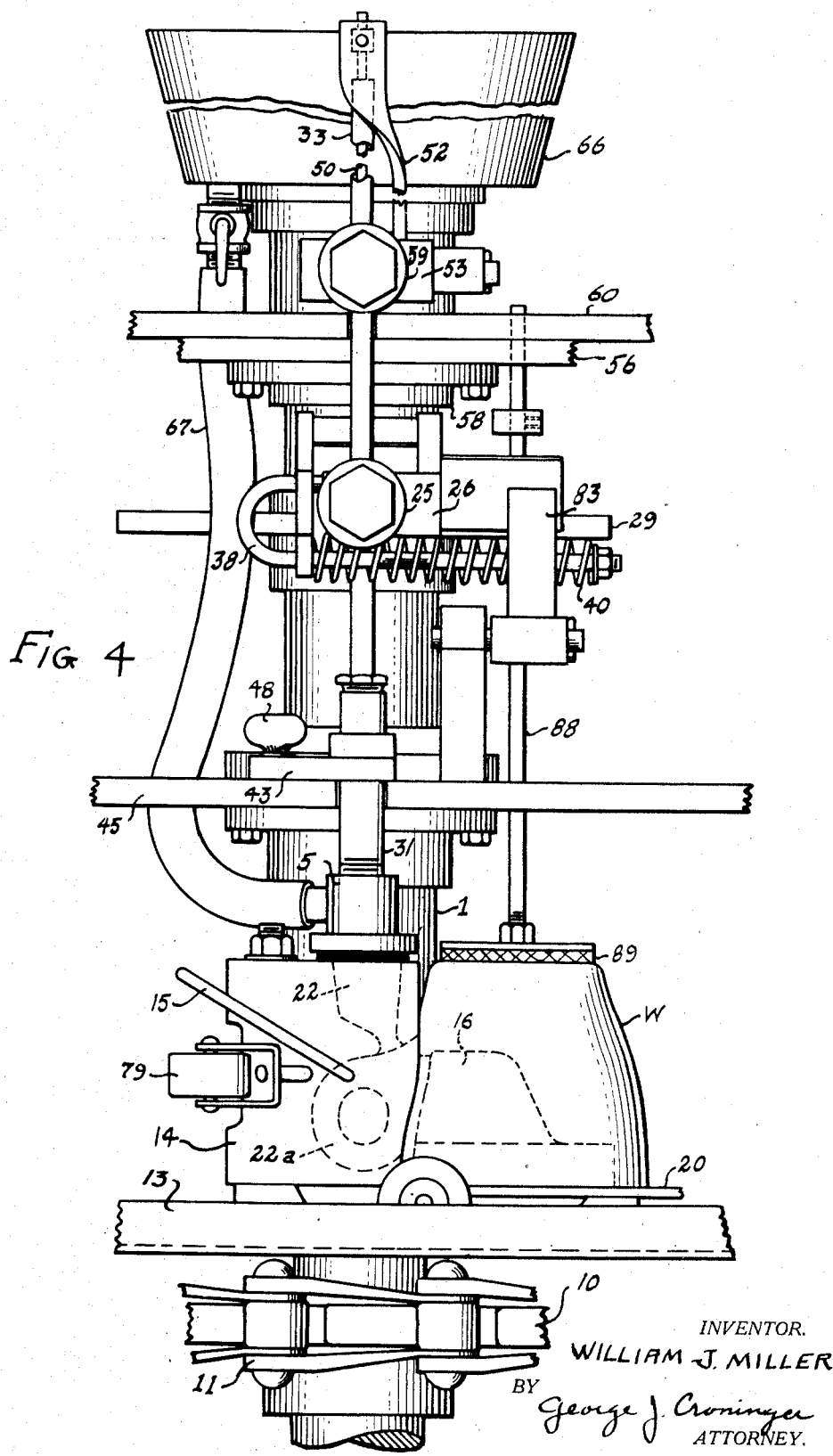

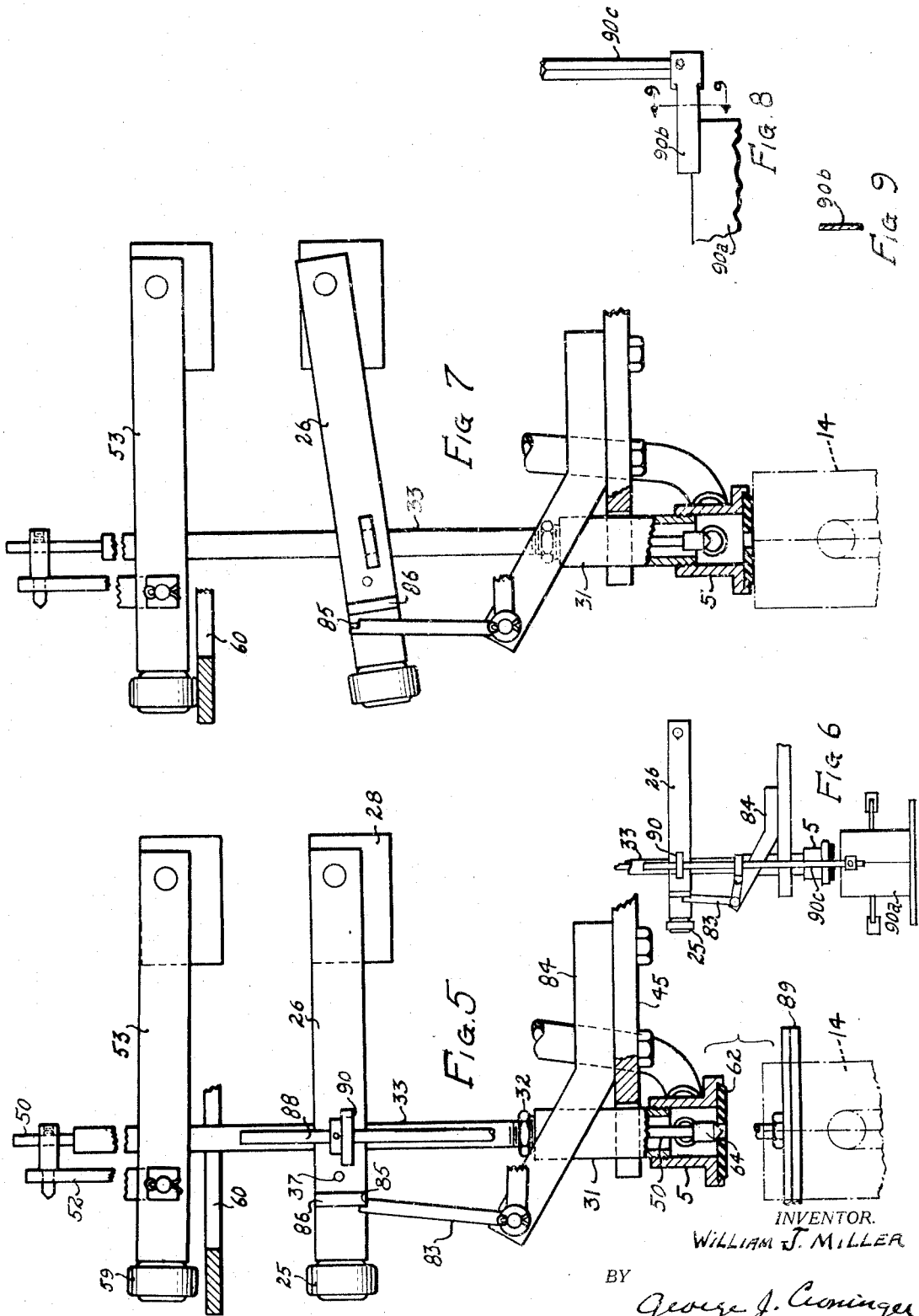

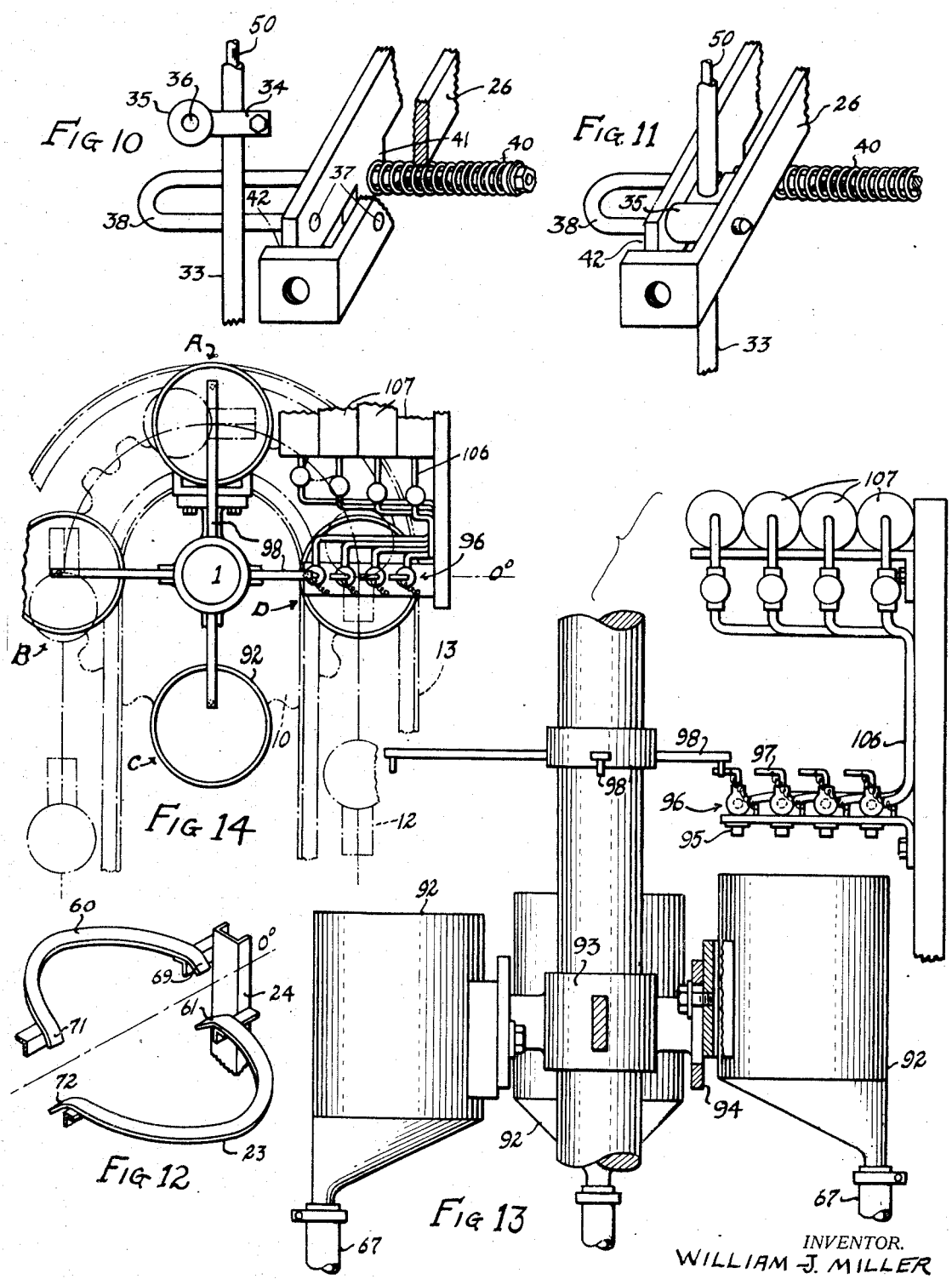

Patented June 25, 1946

2,402,655

UNITED STATES PATENT OFFICE 2,402,655

POTTERY SLIP-CASTING APPARATUS

William J. Miller, Swissvale, Pa., assignor to Miller Pottery Engineering Company, Swissvale, Pa., a corporation of Pennsylvania Application September 22, 1943, Serial No. 503,378

20 Claims. (Cl. 25—29)

This invention relates to apparatus for feeding clay to molds in the manufacture of slip cast potteryware. It has to do with an improved feeding mechanism of the type disclosed in a copending application to William J. Miller, et al., Serial No. 392,276, filed May 7, 1941, (Patent No. 2,349,292). It is adapted for feeding slip to the appendage forming molds of apparatus for forming and uniting appendages to preformed potteryware, but is not necessarily limited to this use and may be employed to fill regular casting molds with slip, for instance, molds for making creamers, sugars, gravies and the like.

In the co-pending application mentioned, a series of appendaging units, each having a separable appendage forming mold, are attached to a chain conveyor and transported thereby along a path wherein clay slip is fed thereto by a continuously rotating turret type feeding mechanism comprising a plurality of independently operated feeders mounted on a common support. After each mold is brought in turn into register with the nozzle of a selected feeder, a predetermined amount of slip is automatically discharged into the molding cavity thereof. Automatically operable flow-control mechanism governs the discharge of material into the mold and means are provided to prevent the operation of any feeder if the molding cavity is not completely closed, such as would be the case if the appendaging unit being served thereby did not have a piece of ware thereon.

One of the objects of this invention is to provide for quickly and easily replacing the individual feeders of the turret feeding mechanism whereby, if a feeder becomes clogged or otherwise unserviceable, it may be expeditiously replaced and serviced at leisure without any appreciable interruption to production.

Another object is to provide adjustable means for regulating the hydro-static pressure of the slip being fed to the molds by the several feeders to thereby enable (1) the feeding of slip of different viscosities requiring different pressure heads to obtain the desired rate of flow to completely fill the molding cavity within the normal time interval the mold and feeder are in register and (2) the application of only that amount of pressure as required to fill the mold without forcing the material through the joints.

Another object is to provide means for obtaining sufficient hydro-static pressure to insure complete and proper filling of the molding cavity with slip and force out all air which might otherwise become entrapped in remote air-locked portions of the cavity, particularly where the slip is extremely viscous and does not flow readily.

Other objects are to provide for feeding slip of different color, composition or amount to successive molds; to provide flow-control mechanism, capable of giving long, trouble-free, leak-proof service in governing the discharge of highly abrasive slip; to provide improved mechanism for automatically rendering any of the feeders inoperative under certain conditions when it becomes undesirable to feed the material and to provide a novel system and apparatus for supplying slip to a plurality of feeders from individual sources.

In the drawings:

Fig. 1 is a side elevation of improved apparatus for appendaging potteryware having incorporated therein the novel feeding provisions hereof.

Fig. 2 is a plan view of the apparatus of Fig. 1.

Fig. 4 is a front elevation of any of the individual feeders of the turret feeder.

Fig. 5 is a detail of the slip nozzle and flow-control mechanism with some of the parts in section and others broken away illustrating how the safety device prevents normal feeding operation under certain conditions.

Fig. 6 is a view of the apparatus of Fig. 5, illustrating a feeding operation.

Fig. 7 is a detail illustrating how the apparatus of Fig. 5 is adapted for feeding regular hollow ware molds and certain modifications in the safety device for preventing normal operation of the feeder.

Fig. 8 is a detail of the pitman and feeder employed with the safety device of Fig. 6.

Fig. 9 is a section taken on line 9—9 of Fig. 8.

Fig. 10 is a detail in perspective of the lever for raising and lowering the slip discharge nozzle illustrating how the nozzle may be quickly detached from its support sructure.

Fig. 11 is a detail in perspective showing the apparatus of Fig. 10 in assembled relation.

Fig. 12 is a detail in perspective of the turret feeder cams.

Fig. 13 is a plan view of a modified form of apparatus for feeding slip to the several turret feeders.

Fig. 14 is a plan view of the apparatus of Fig. 13.

Figure 3:
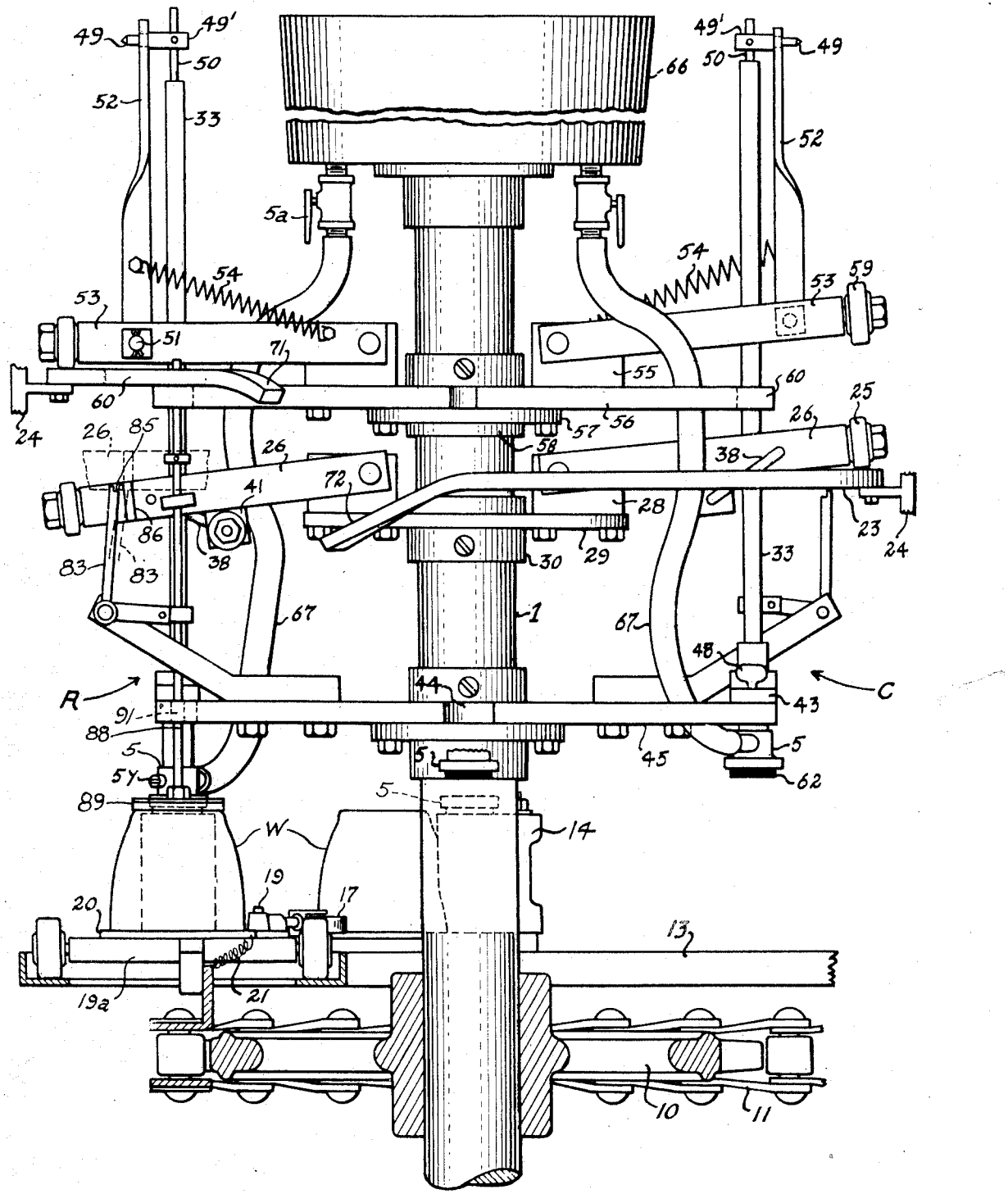
Fig. 3 is an elevation of the turret feeder of Fig. 1 with certain of the parts in section.

In Figs. 1 and 2, 1 is a rotatable post on which a plurality of individual feeders, A, B, C and D, Fig. 14, are mounted for rotation therewith. The feeders are enclosed in a stationary, sectional, protective housing 2 supported on uprights 3 and are accessible through an inspection door 4 in the enclosure, the nozzle 5 of the feeders projecting below the bottom of the housing.

The post is continuously rotated by a motor 6, variable speed transmission 7, drive gear 8 and driven gear 9 on the post. Sprocket 10, Fig. 3, mounted on the post drives a chain conveyor 11 to which appendaging units 12 are attached in equi-distantly spaced relation that roll around the circuit on track 13 whose inside rail is interrupted in the circular section around post 1.

Each appendaging unit has a separable mold 14 normally held in closed position by a spring clamp 15, Fig. 4. At or about the position E, Fig. 2, preformed ware W, is loaded on the conveyor by inverting over the pressure equalizing thrustor 16 of an appendaging unit and supported on a platform 20 pivoted at 19, Fig. 3, on the wheeled undercarriage 19a of the unit. The platform is held in retracted position relative to the separable mold 11 at this time by engagement of a cam follower 17 attached to the platform with an elongated trackside cam 18 against the tension of a retracting spring 21 which, when the follower 17 is released from the cam, moves the ware into seating engagement with the ware receiving surface of the closed mold by rotating the platform about the off center axis. The molding cavity 22a of the mold is now closed and in readiness to be filled with slip to form and attach an appendage to the ware.

The appendaging units move up to the feeders along a path that is tangent to the sprocket 10 and move in a circular path of travel with the feeders about the vertical axis of post 1. At the 0° position, Figs 2, 12 and 14, consecutive feeder nozzles 5 are brought into vertical register with the filling openings 22, Fig. 4, of successive molds therebelow and travel therewith for 180° during which time the operation of feeding slip thereto is automatically performed in the following manner and with the following apparatus.

Since all feeders are constructed alike and operate in the same fashion, only one will be described, although a plurality are shown mounted on the post 1. The feeder nozzle 5 is raised above the mold as it approaches the 0° position by a stationary, semi-circular cam 23 supported on the spaced uprights 24. This cam is engaged by a cam follower 25 attached to the outer end of a radially positioned nozzle lifting lever 26 which is bifurcated and pivotally attached to bearing block 28 bolted to the horizontal flange 29 of sleeve 30 secured to post 1.

The nozzle is screwed on the lower end of a pipe 31, Fig. 5, held by an adjusting nut 32 on the lower end of pipe 33, which is detachably secured to lever 26 by an adjustable pipe clamp 34, see Figs. 10 and 11, and a manually operable slide connector 38. The slide connector is U-shaped and the short leg is received in holes 37 in the lever which register with holes 36 in pipe clamp boss 35 and the long leg projects through a hole 40 in lug 41 integral with the lever and has a coil spring thereon. To quickly release the pipe and nozzle from lever 26, the connector is pulled back against the tension of the spring by hand far enough to slide the bolt out of the holes and the pipe is then ready to be moved out through the clearance space 42 between the extremities of the lever 26.

Before this pipe is released, hose 67 is disconnected and a lug 43, Fig. 4, clamping the pipe in a locating socket 44, Fig. 3, in the perimiter of disc 45 is first retracted by loosening set screw 48 holding the clamp to the disc. Also, the valve stem 50 inside pipe 33, Figs. 3 and 4, is disconnected from the valve stem lifting lever 53 by tilting link 52 back on its pivot 51 against the tension of spring 54 to disengage pin 49 on adjustable collar 49' secured to the valve stem. These operations are quickly and easily performed and expedite replacement of clogged feeders, such replacement being made in an obvious manner in view of the foregoing description.

The valve stem lifting lever 53 comprises a radially disposed, bifurcated member pivotally connected to a bearing block 55 mounted on a disc 56 bolted to the flange 57 of a sleeve 58 secured to post 1 above sleeve 30. A cam follower 59 is attached to the outer end thereof for engagement with another stationary, semi-circular cam 60 mounted on uprights 24 above and facing cam 23, Figs. 3 and 12.

With the inlet 22 of a mold 11 and a nozzle 5 in vertical registration at the 0° position, then upon further angular movement thereof, the cam follower 25 drops off the downwardly inclined end 61 of cam 23 and the nozzle 5 is lowered until the perforated gasket 62, Fig. 5, seals against the upper surface of the closed mold surrounding the inlet 22. Lever 53 and valve stem 50 also drop down which maintains the valve closure 64 in engagement with the valve seat 65 and prevents slip from flowing out of container 66, Fig. 3, on post 1, through hose 67 into the valve chamber before the nozzle is properly seated. After the nozzle is seated, the valve is opened by the engagement of cam follower 59 with the upwardly inclined portion 69 of cam 60, Fig. 10, which lifts lever 53 and pulls the valve stem upwardly. The interval of time which may elapse between the seating of the nozzle and the initiation of flow through the nozzle will depend upon the spacing between the opposed ends of the respective cams this being a matter of choice depending on the time required to fill the mold and the rapidity with which the slip will flow into the chamber. If it is desired to interrupt the discharge during mold filling, cam 60 may be developed to provide the desired valve action. As the mold and nozzle approach the 180° position, Figs. 3, 12 and 14, cam follower 59 drops down the inclined end 71 of cam 60 and closes the valve and thereafter cam follower 25 engages the inclined portion 72 of cam 23 and raises the nozzle 5 from the mold before the nozzle and mold commence to move out of vertical registration.

The charged mold is thereafter conveyed away from the feeder whilst the feeder continues on around the axis of the post with the nozzle in raised position to the 0° position where it cooperates with and services a succeeding mold. The charged mold enters an air-conditioned chamber 73 where proper atmospheric conditions for maturing the appendage within a given period of time are maintained by an air-conditioning unit having motor operated blowers 76 to circulate the air. The conveyor travels in a serpentine path inside the chamber 73 over vertically spaced sprockets 77 on vertical shafts 78, the ascending and descending chain courses travelling in paths whose angle of inclination is small to avoid spilling of the contents of the mold.

As the appendaging units enter track section F, cam followers 79 attached to the mold sections engage a pair of elongated stationary trackside cams 80 which spread the mold sections apart and expose the appendage which is now solidified and attached to the ware. Just before the mold opens, cam roller 17 engages cam 18 which is developed to slightly retract platform 20 to relieve the pressure of the ware against the mold only before the mold is opened to prevent marring the ware when the mold is opened. Thereafter the ware platform 20 is fully retracted—in order that the ware may be lifted from the appendaging unit as it passes beneath the stripping opening 81. The molds of the empty units are cleaned and dried as they move toward the exit end of the chamber by a line of overhead nozzles 82 which discharge clean, conditioned air thereinto drawn from the conditioner 82a to prepare the molds for the next trip around the circuit or air may be drawn from other sections of the chamber 13 through pipe 82b by means of blower 82c, the object being to recirculate the air, if desired, until spent. Upon leaving the chamber, the mold is automatically closed as the cam followers 79 leave cams 80 and before the cam follower 17 is released from cam 18, a piece of ware is placed on the unit and the cycle of operations described heretofore repeated.

To prevent the discharge of slip through any nozzle under certain conditions where it is undesirable to do so, for instance where there is no ware on the appendaging unit thereby resulting in the incomplete closing of the mold cavity or where, in the case of regular casting molds, the mold sections are not entirely closed or, the mold has been removed and the space below the nozzle is empty, I have provided a safety device to be associated with each feeder having a bellcrank 83, Fig. 4, pivotally mounted on the upwardly and outwardly inclined extension of a support 84 mounted on pin 45. The vertical leg of the bellcrank has a notch 85 for engagement with a projection 86 on the side of lever 26 and the other leg is pivotally connected to a set collar secured to a rod or pitman 88, received and guided for vertical movement by apertured lug 90 on the side of lever 26 and hole 91 in plate 45. An adjustable set collar is attached to the rod above lug 90.

In the form of safety device to be used with feeders for supply appendaging units with slip, the pitman 88 has a disc 89, Fig. 3, faced with felt attached to the lower end thereof. When a ware bearing appendaging unit and a feeder nozzle 5 move into registration at the 0° position, 89 drops down as the feeder nozzle is lowered and comes to rest on top the cup about the time lever 26 reaches a horizontal position. As the disc drops down, bellcrank 83 pivots from the dotted line position shown in Fig. 3 to the full line position adjacent lug 86 but the notch 85 does not intercept the lug thereby permitting the lever 26 to drop on down to seat the nozzle on the mold. However, should the appendage unit be empty of ware, the descent of the pitman is not arrested and the bellcrank is pivoted into a position where the lug 86 drops into the notch 85 when it reaches a position slightly below the horizontal, Fig. 5, thus halting further downward movement of the lever and holding the nozzle in raised position above the plane of the mold top. This causes lever 53 to remain in an upwardly inclined position with the cam roller 59 out of contact with cam 60 thus prohibiting the opening of the slip discharge valve in nozzle 5. Cam roller 25 is dropped down far enough in this position to engage the inclined portion 72 of cam 23 to thereby raise the feeder nozzle and disc 89 before cooperation with a succeeding appendaging units. If the feeder is to remain out of service for an indefinite interval the slip can be shut off by a stop cock 5a between the hose 67 and container 66.

If the feeder is being used to charge casting molds for making regular cast ware, for instance, a mold such as that illustrated at 90a and shown and described in detail in a copending application S. N. 486,984, a short blade 90b, Figs. 8 and 9, is employed which is located in direct alignment with the seam between the mold sections. A square rod 90c is substituted for the pitman 88 and the hole through lug 90 is squared to prevent turning. Thus if a mold fails to close properly the blade will drop into the crack and throw the safety catch into intercepting position or if the mold is absent the catch will be set and the feeder will remain inoperative. Otherwise, the blade will come to rest against the top of the mold and the feeder will function in normal fashion.

Figs. 13 and 14 show apparatus which may be used to supply slip to the individual feeders. Instead of a single slip container, each nozzle 5 is connected by hose 67 to a separate supply tank 92 mounted thereabove on the arms of a spider 93 secured to the center post. Each tank is bolted to a plate 94 on which it is vertically adjustable. At the 0° position, a bank of overhead discharge nozzles 95 is mounted on the framework in such position as to discharge into any one of the tanks 92. Each nozzle has a control valve 96 with spring return operating lever 97, to be engaged by a pin 98' depending from one of the arms 98 over each tank of a spider secured to and rotatable with part 1. Each time a given feeder passes below the nozzles 95, the associated arm opens a given valve which discharges a predetermined amount of slip into the tank to replenish slip withdrawn to fill the mold.

Nozzles 95 are each connected by a supply line 106 leading to one of several overhead reservoirs 107 in which slip is stored. With the foregoing arrangement slip of different color, viscosity or composition may be fed to successive molds. The hydrostatic pressure of the slip as between the several nozzles 5, may be varied by raising or lowering tanks 92. This is advantageous because some slips are thicker than others and do not flow readily. Furthermore, the passage connecting the inlet 22 with the molding cavity is preferably a slit and adequate pressure is desired to force slip of any viscosity therethrough.

I claim:

1. The combination with a traveling, partible potteryware casting mold of a traveling feeder thereabove movable into and out of register with said mold for discharging slip into said mold, and means operable to preclude the discharge of slip from the feeder into the mold when in register in case the mold is not entirely closed including a member arranged so as to move into the clearance space between mold sections.

2. The combination with a traveling potteryware mold of a traveling feeder thereabove for discharging slip into said mold, a support for said feeder, actuating mechanism therefor and a quick release connector between the feeder and the actuating mechanism therefor.

3. The combination with a traveling potteryware forming mold of a traveling nozzle thereabove for feeding slip thereto movable into and out of register therewith, mechanism for raising and lowering said nozzle, a valve for controlling the discharge of slip through said nozzle having a vertically positioned valve stem to be raised to open the valve, a valve stem actuator and means for rendering said nozzle actuating mechanism inoperative operable to render said valve stem actuator inoperative.

4. The combination with a traveling potteryware forming mold of a traveling nozzle thereabove for feeding slip thereto movable into and out of register therewith, mechanism for lowering said nozzle into feeding position, a valve for controlling the discharge of slip through said nozzle having a vertically positioned valve stem to be raised to open the valve, an actuator for said valve stem, and means actuated by said nozzle lowering means for rendering said valve stem actuator inoperative.

5. The combination with a traveling potteryware forming mold of a traveling nozzle thereabove for feeding slip thereto movable into and out of register therewith, a valve for controlling the discharge of slip therethrough, separate actuators for said valve and nozzle and means actuated by one of said actuators for rendering the other operative.

6. The combination with a traveling potteryware forming mold of a traveling nozzle thereabove for feeding slip thereto movable into and out of register therewith, a valve for controlling the discharge of slip therethrough, separate actuators for said valve and nozzle and movable means for rendering both of said actuators inoperative during a period when said actuators normally function which is operable in response to changes in resistance to movement of said means.

7. The combination with a traveling, partible potteryware forming mold of a traveling nozzle thereabove for feeding slip thereto movable into and out of register therewith, an actuator for raising and lowering said nozzle relative to the mold, a valve for controlling the discharge of slip through said nozzle, an actuator therefor, and means for determining if the mold is properly closed to receive a charge of clay operable to render said valve actuator inoperative except when the mold is in readiness to receive the discharge from the nozzle.

8. The combination with a traveling appendage forming and attaching apparatus of a traveling nozzle thereabove for co-operation therewith for feeding slip thereto movable into and out of register therewith, a cam actuated means for raising and lowering said nozzle, flow-control mechanism for governing the discharge of slip through the nozzle and another cam actuated mechanism for operating said flow control mechanism.

9. The combination with a traveling appendage forming and attaching apparatus having a ware-receiving member and a separable relatively movable mold of a traveling nozzle thereabove for cooperation with the mold for feeding slip thereto, cam actuated means for raising and lowering the nozzle, flow control mechanism for governing the discharge of slip through the nozzle, another cam actuated mechanism for actuating said valve and means operable to render said cam actuated mechanism inoperable if the mold is unready to receive the discharge.

10. The combination with an appendaging unit for forming and uniting appendages to prefabricated potteryware including ware receiver and relatively movable separable appendaging mold of a traveling nozzle arranged thereabove for feeding slip to the mold thereof movable into and out of register therewith, an actuator for raising and lowering said nozzle relative to said mold, flow control means for governing the discharge of slip through said nozzle, another actuator operated independently of the first for operating said flow control mechanism and means for rendering said flow control actuator inoperative.

11. The combination with a traveling appendaging unit for forming and uniting appendages to prefabricated ware including a ware receiver and relatively movable separable mold, a traveling nozzle arranged thereabove for feeding slip to said mold, flow-control mechanism for governing the discharge of slip through said nozzle, and elongated stationary cams for automatically opening the mold and moving the receiver relative thereto to permit removal of completed ware therefrom and the placement of ware to be appendaged thereon.

12. The combination with a traveling appendaging unit including a separable mold and relatively movable ware receiver of a traveling nozzle thereabove for feeding slip to said mold, means for raising and lowering said nozzle, flow control mechanism for governing the discharge of slip thereinto, and means for opening said mold to permit the removal of completed ware therefrom operable to hold the mold open under tension during an interval when the mold is cleaned and dried, and means for cleaning and drying said mold.

13. The combination with apparatus for transporting molds for slip casting potteryware along a path where slip is fed thereto and ware formed therein of a slip feeder for charging said molds with slip including a rotatable support, a plurality of feeders mounted thereon, means for raising and lowering said feeders, a cam for actuating said last named means, flow control mechanism for govering the discharge of slip from the several feeders, and another cam for actuating said flow control mechanism for governing the discharge of slip from the several feeders.

14. In combination with apparatus for transporting a line of slip casting molds along a path wherein clay is fed thereto, means for feeding clay slip to consecutive molds moving in said line comprising a plurality of traveling feeders each having a nozzle movable into and out of register with selected molds, cam actuated means for raising and lowering said nozzles, flow-control mechanism and means for varying the hydrostatic pressure of the slip as between the clay feeders.

15. The combination with a plurality of traveling potteryware forming molds of a plurality of nozzles thereabove for feeding slip thereto movable into and out of register therewith said nozzles having conduits leading back to sources of supply and having flow control mechanism associated therewith, said nozzles and sources of supply being arranged to feed slip of different color, composition or viscosity to the molds and having means enabling variation in the hydrostatic pressure of the slip being fed through any given nozzle.

16. The combination with a traveling potteryware forming mold of a traveling nozzle thereabove for feeding slip thereto movable into and out of register therewith, a slip reservoir, a conduit connecting said nozzle with said reservoir having automatically actuated flow control mechanism associated therewith, a primary source of slip supply and means traveling with each nozzle for effecting a discharge of slip from said source of supply into said reservoir between feeding operations.

17. The combination with a plurality of traveling potteryware molds of a plurality of traveling nozzles thereabove for feeding slip thereto movable into and out of register with successive molds, a slip reservoir for each nozzle, a conduit connecting each nozzle to a reservoir, a plurality of primary sources of slip supply and means traveling with each nozzle for effecting a discharge of slip from one of the sources of supply into the reservoir associated with the nozzle.

18. In apparatus for slip casting potteryware, a movable casting mold, a support formed for carrying said mold in a curved path about an axis, a slip discharge nozzle rotatable about the axis into and out of register with the mold, a nozzle support, means for raising and lowering said support, a valve for controlling the discharge of slip through said nozzle and a valve actuator operable independently of said raising and lowering means.

19. In apparatus for slip casting potteryware, a movable casting mold, a support formed for carrying said mold in a curved path about an axis, a slip discharge nozzle rotatable about the axis into and out of register with the mold, a support member for lifting and lowering the nozzle relative to the mold, a valve member for controlling the discharge of slip through said nozzle and a separate control for each member.

20. In apparatus for slip casting potteryware, a movable casting mold, a support formed for carrying said mold in a curved path about an axis, a slip discharge nozzle rotatable about the axis into and out of register with the mold, a support member for lifting and lowering the nozzle relative to the mold, a valve member for controlling the discharge of slip through said nozzle and a separate control for each member, the controls being positioned so as to alternately operate the members.

WILLIAM J. MILLER.